March 27, 1951     E. HOLLOWAY     2,546,823
ROCKET MACHINE GUN

Filed Nov. 10, 1948     5 Sheets-Sheet 1

INVENTOR.
Ernest Holloway
BY Victor J. Evans & Co.
ATTORNEYS

March 27, 1951   E. HOLLOWAY   2,546,823
ROCKET MACHINE GUN

Filed Nov. 10, 1948   5 Sheets-Sheet 2

INVENTOR.
Ernest Holloway

BY *Victor J. Evans & Co.*

ATTORNEYS

March 27, 1951 E. HOLLOWAY 2,546,823
ROCKET MACHINE GUN
Filed Nov. 10, 1948 5 Sheets-Sheet 3
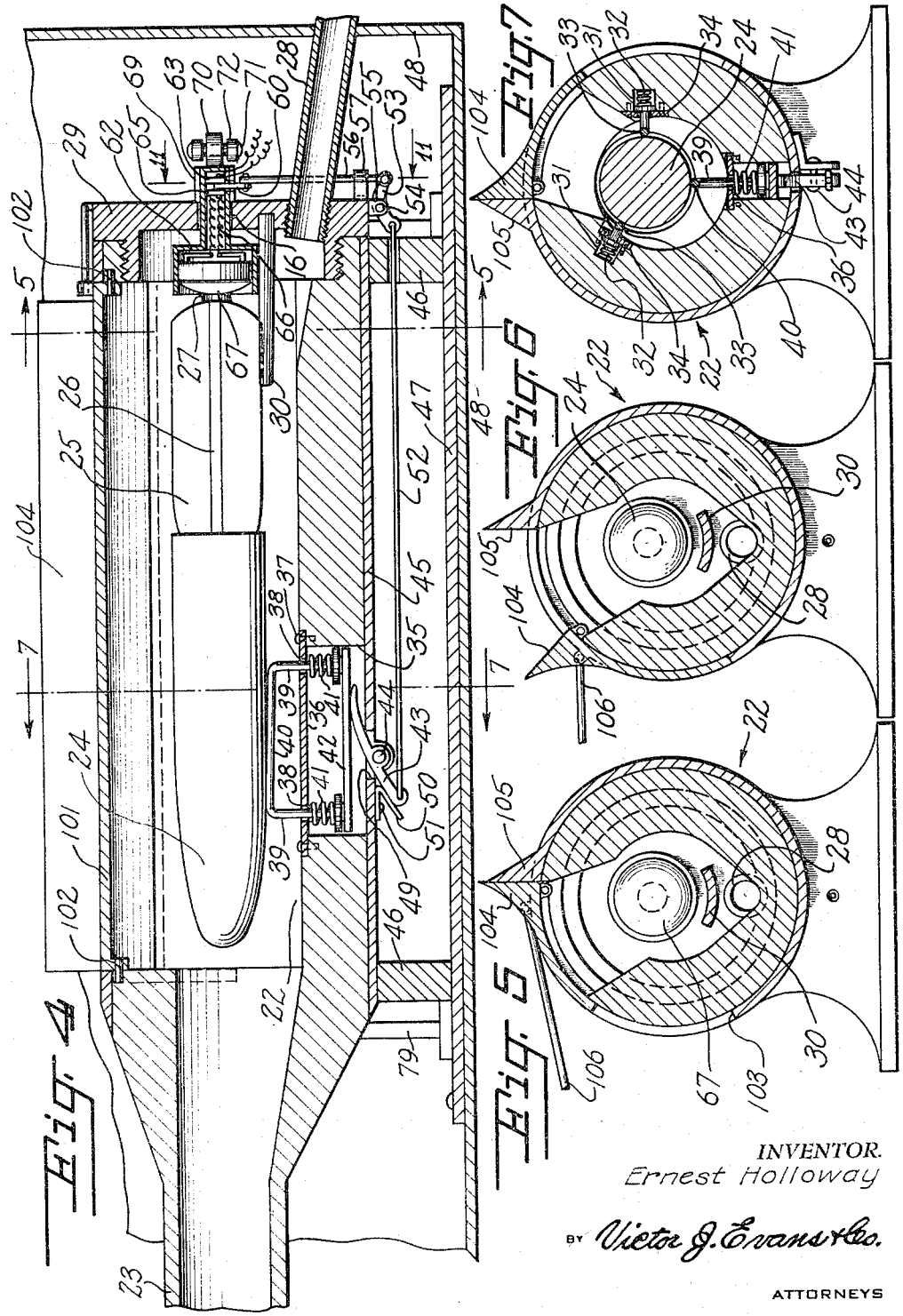
INVENTOR.
Ernest Holloway
BY Victor J. Evans & Co.
ATTORNEYS March 27, 1951 E. HOLLOWAY 2,546,823
ROCKET MACHINE GUN
Filed Nov. 10, 1948 5 Sheets-Sheet 4
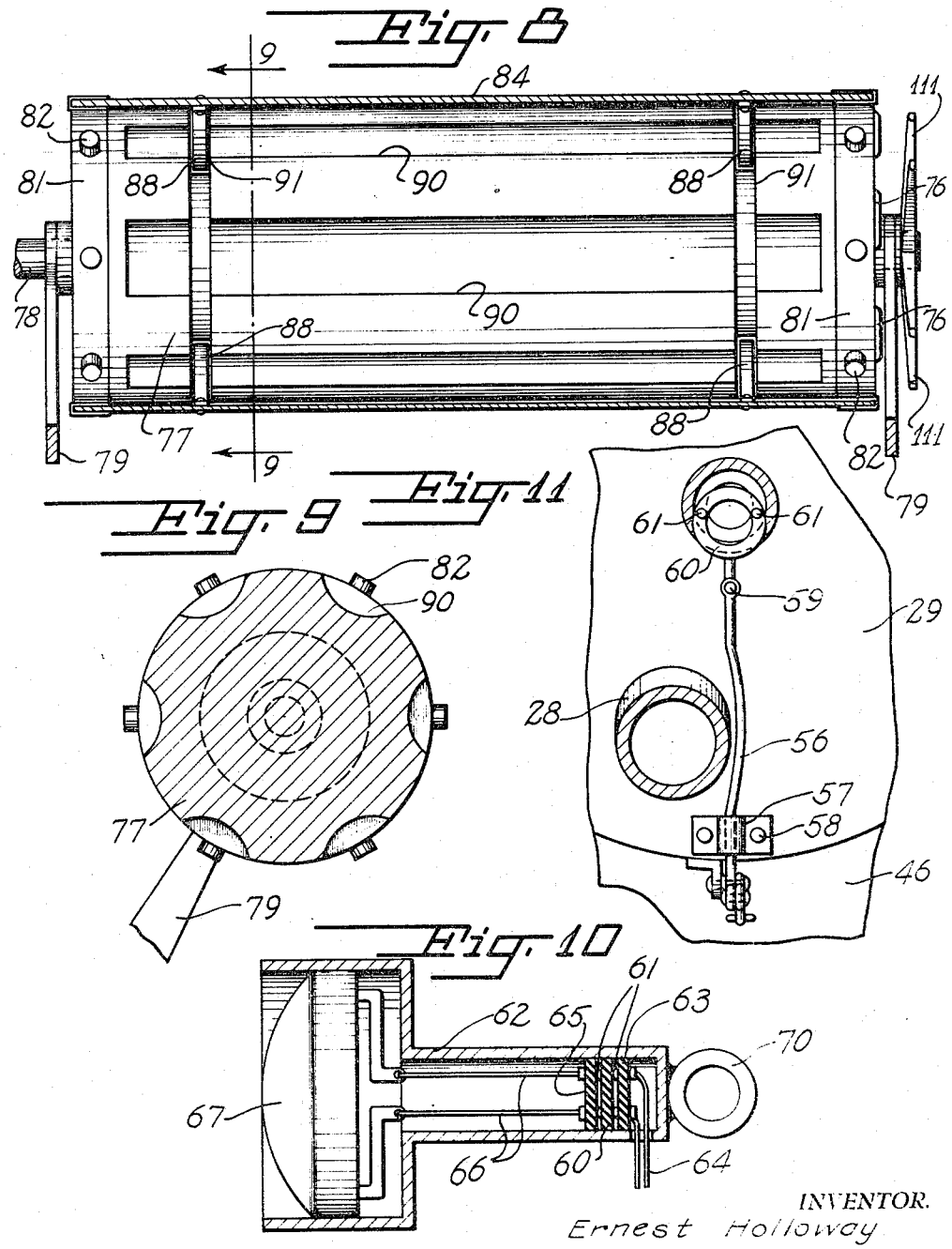
INVENTOR.
Ernest Holloway
BY Victor J. Evans & Co.
ATTORNEYS March 27, 1951     E. HOLLOWAY     2,546,823
ROCKET MACHINE GUN
Filed Nov. 10, 1948     5 Sheets-Sheet 5
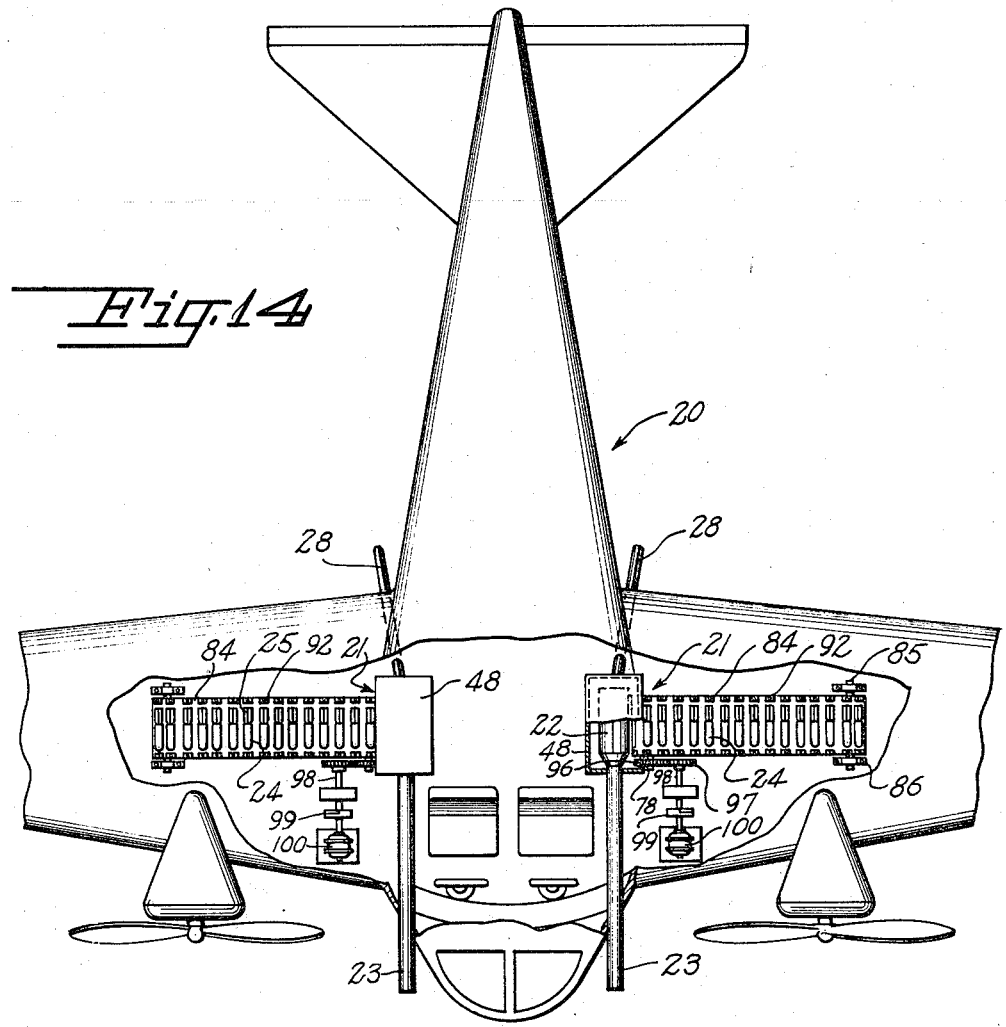
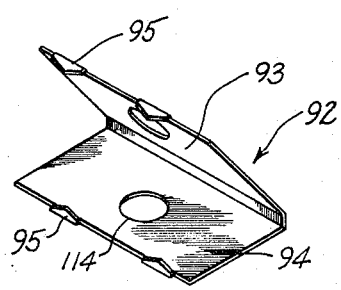
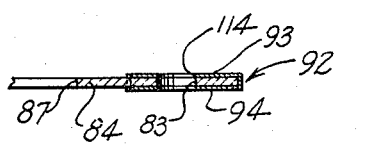
INVENTOR.
Ernest Holloway
BY Victor J. Evans & Co.
ATTORNEYS Patented Mar. 27, 1951

2,546,823

UNITED STATES PATENT OFFICE 2,546,823

ROCKET MACHINE GUN

Ernest Holloway, Cleveland, Ohio

Application November 10, 1948, Serial No. 59,205

4 Claims. (Cl. 89—1.7)

This invention relates to improvements in ordnance, and more particularly to a rocket-launching device for aircraft.

An object of the invention is to provide an aircraft rocket-launching device which will provide a novel offensive weapon for the aircraft.

Another object of the invention is to provide an aircraft rocket-launching device for dispatching a rocket of the reaction type formed with a self-contained charge.

Yet another object of the invention is to provide an aircraft rocket-launching device for firing in rapid succession a rocket of great caliber of high destructive power.

A further object of the invention is to provide an aircraft rocket launcher in which there is a minimum of recoil, although dispatching a relatively heavy shell of great destructive possibilities.

A still further object of the invention is to provide a novel aircraft launcher for rocket projectiles which is foolproof and efficient in use.

Other objects and advantages will be apparent during the course of the following description.

In the accompanying drawings forming a part of this application, and in which like numerals are employed to designate like parts throughout the same:

Figure 4 is a vertical longitudinal sectional view of the firing chamber, with a rocket in firing position therein;

Figure 5 is a sectional view taken on the line 5—5 of Figure 4;

Figure 6 is a view similar to Figure 5, but showing the firing chamber door in open position;

Figure 7 is a sectional view taken on the line 7—7 of Figure 4;

Figure 8 is a side elevational view of the belt roller and parts thereof in section;

Figure 9 is a sectional view taken on the line 9—9 of Figure 8;

Figure 10 is an enlarged horizontal sectional view showing the mechanism for electrically firing the rockets;

Figure 11 is a sectional view taken on the line 11—11 of Figure 4;

Figure 12 is a sectional view taken on the line 12—12 of Figure 1;

Figure 13 is a perspective view of one of the clips for reinforcing the belt;

Figure 14 is a top plan view with parts broken away of an aircraft provided with a pair of rocket-launching devices, according to the present invention.

Figure 1:
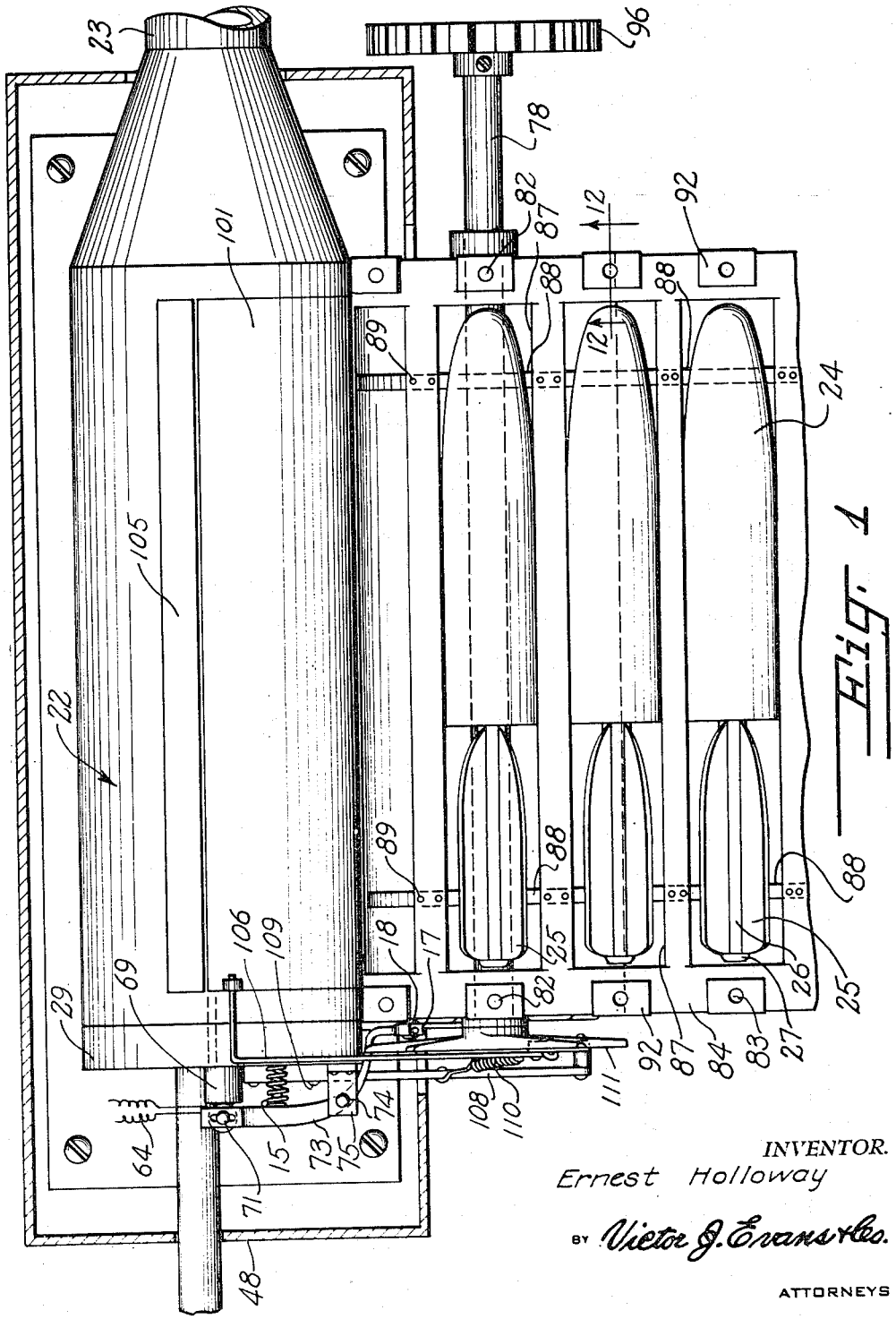
Figure 1 is an elongated fragmentary top plan view of the firing chamber and conveyor belt of the aircraft rocket launcher, according to the present invention.

Referring in detail to the drawings, the numeral 20, Figure 14, designates a conventional airplane provided with a pair of rocket-launching devices 21 therein, and as each of the rocket-launching devices has the same construction, only one will be described in detail.

The rocket-launching device comprises a hollow cylindrical firing chamber 22 provided with a forwardly-projecting barrel 23 for the discharge therethrough of a rocket 24. The firing chamber 22, Figure 4, rests on a plate 45 which is supported by uprights 46 that project from a bottom wall 47. The bottom wall 47 is secured by bolts to a housing 48 which partially surrounds the firing chamber 22 and serves to protect the aircraft from heat generated in the firing chamber. A rocket 24 has fins 25 secured to the rear end for guiding the missile in flight. A burster 26 fabricated of suitable powder for propelling the missile is arranged intermediate the fins 25 and a fuse 27 is connected to the rear end of the burster 26 for igniting the latter.

A conduit 28 is threaded into the back wall 29 which is threaded into the rear of the firing chamber for the egress therethrough of exhaust gases resulting from the firing of the rocket. The fins 25 of the rocket 24 rest on an arcuate plate 30 which projects into the firing chamber and has one end secured to the back wall 29. For centering the rocket 24 in the firing chamber, Figure 7, a pair of spaced radially-disposed sockets 31 are arranged in the interior wall of the firing chamber. A coil spring 32 is positioned in the socket and maintained therein by a retaining member 34. The coil spring 32 biases a lug 33 into engagement with the exterior surface of the rockets 24 to center the latter.

For automatically firing the rockets 24, a cut-out 35, Figure 4, is formed in the bottom of the firing chamber 22, there being a plate 36 extending across the cut-out 35 and secured to the bottom of the firing chamber by rivets 37. Slidably projecting through a pair of spaced apertures 38 in the plate 36 are the legs 39 of a U-shaped yoke 40 which is adapted to be engaged by and depressed by each rocket as it enters the firing chamber. A pair of coil springs 41 act as shock absorbers and are circumposed on the legs 39 for normally biasing the yoke 40 downwardly. The lower ends of the legs 39 engage a horizontally-disposed strap 42 whose lower surface is in engagement with one end of a lever 43 which is pivotally connected by means of a pin 44, Figure 4, to the firing chamber. The lever 43 projects through an opening 49 in the plate 45 and a spring 50 is secured by a rivet 51 to the under surface of the plate 45 and engages a portion of the lever 43 for pivoting the lever to bias the yoke 40 upwardly when there is no rocket in the firing chamber 22. An elongated rod 52 has one end pivotally connected to the projecting end of the lever 43 and its other end pivotally connected to a link 53 which is mounted for swinging movement on a pin 54 that is dependingly carried by a pair of lugs 55 which are secured to the back wall 29. The other end of the link 53 is pivotally connected to the lower end of a rod 56 which is arranged adjacent the exterior of the back wall 29 and is slidably supported by a bracket 57 that is secured to the back wall 29 by rivets 58.

Secured to the upper end of the rod 56 by a bolt 59 is a ring 60 having a pair of spaced projecting metal contacts 61 thereon for a purpose to be subsequently described. The ring 60 slidably projects through the wall of a sleeve 69. The sleeve 69 embraces the projecting end of a support member or housing 62 and arranged in this projecting end is a first insulated spacer disc 63 which carries a pair of electrical conductor cables 64 that lead to a source of electrical energy such as the aircraft battery (not shown). Arranged in spaced, parallel relation with respect to the first spacer disc 63, Figures 4, 10 and 11, is a spacer disc 65 made of suitable insulation and projecting from the disc 65 is a pair of electrical cables 66 which are electrically connected to a hot plate 67 which is secured within the support member 62, the hot plate 67 having an arcuate front face for selective engagement with rocket fuse 27. Thus, in operation, when a rocket 24 is in the firing chamber, the yoke 40 is moved downwardly against the force of the spring 50 to thereby move the ring 60 downwardly so that the contacts 61 on the ring 60 will close the electric circuit leading to the hot plate 67 and heat the latter to thereby ignite the fuse 27 and fire the rocket. In Figure 4 there is shown a vertical sectional view, while Figure 10 is a horizontal sectional view.

The projecting end of the support member 62 is slidably mounted in an opening 16 in the back wall 29 so that the face of the hot plate 67 can be moved into engagement with the fuse 27, when the rocket is to be fired. For causing sliding movement of the support member 62, a ring or lug 70 is secured to the outer projecting end of the support member 62 and is pivotally connected by a pin 71 to the legs 72 of a rod 73, and a coil spring 15 biases a roller 18 into engagement with a cam surface 76. The rod 73 is pivotally connected intermediate its ends to the exterior of the back wall 29 by means of a pin 74 which is supported in a bracket 75. Secured to the other end of the rod 73 is a frame 17 carrying a rotatable roller 18 which is adapted to be engaged by one of the projecting cam surfaces 76 which are arranged in spaced relation on one end of the cylindrical roller 77 to thereby pivot the rod 73 and move the support member. This is a safety feature of the device since the support member 62 carrying the hot plate 67 will be moved backwards after each rocket 24 is fired and will be moved forwardly to ignite the fuse 27 only when the rocket is ready to be fired.

The roller 77 is rotated by a shaft 78 which extends longitudinally therethrough. A pair of spaced braces 79 provided with suitable bearings on the upper ends support the shaft 78 and roller 77 and the lower ends of the braces 79 extend through openings 80 in the housing 48 and are secured to the bottom thereof. The roller 77 is provided with a sprocket 81 on each end, Figure 8, and each sprocket includes a plurality of spaced, projecting sprocket teeth 82 which register with the spaced openings 83 along each side of a wide rubber belt 84. The belt 84 is trained over the roller 77 and is also trained over a rotatable shaft 85 which is spaced from the roller 77 and is supported on brackets 86, Figure 14.

The belt 84 serves to convey the rockets 24 into the firing chamber 22, and the belt is provided with a plurality of transversely-disposed, spaced, parallel, rectangular slots 87, there being a pair of spaced, parallel, arcuate straps 88 extending below each of the slots 87, Figure 1, and secured by suitable rivets 89 to the under surface of the belt 84. The pair of straps 88 support the rocket 24 during its movement. The straps 88 are so arranged in the belt 84 that the rockets 24 will be carried or positioned in the firing chamber 22 to insure that the fuse 27 of the rocket will be engaged by the hot plate 67 to energize the rocket. In other words, the straps 88 are arranged in a predetermined position which will insure that the rockets 24 are placed properly in the firing chamber 22 to be engaged by the movable hot plate 67. The cylindrical roller 77 is provided with a plurality of longitudinally-extending, spaced, parallel cut-outs 90 which receive the rockets 24 as they reach the roller 77 and upon continued rotation of the roller 77, the rockets 24 are deposited in the firing chamber. The roller 77 has a pair of spaced, parallel, annular grooves 91, Figure 8, therein, so that the straps 88 of the belt can pass therethrough. The side edges of the belt 84 are reinforced by means of a plurality of spaced metal clips or clamps 92, Figure 13. Each clip includes a pair of side walls 93 and 94 for embracing a portion of the belt 84, there being an opening 114 in each of the side walls 93 for registering with openings 83 in the belt 84 so that the sprocket teeth 82 can pass therethrough. The side walls carry sharp tips 95 for fastening the clip onto the belt 84.

The shaft 28 rotates in a counterclockwise direction, as shown in Figure 14, and has secured to one end thereof a first gear 96 which meshes with a second gear 97 that is secured to a shaft 98. The shaft 98 is supported on bearing blocks 99 and is rotated by a suitable motor 100, Figure 14.

Figure 2:
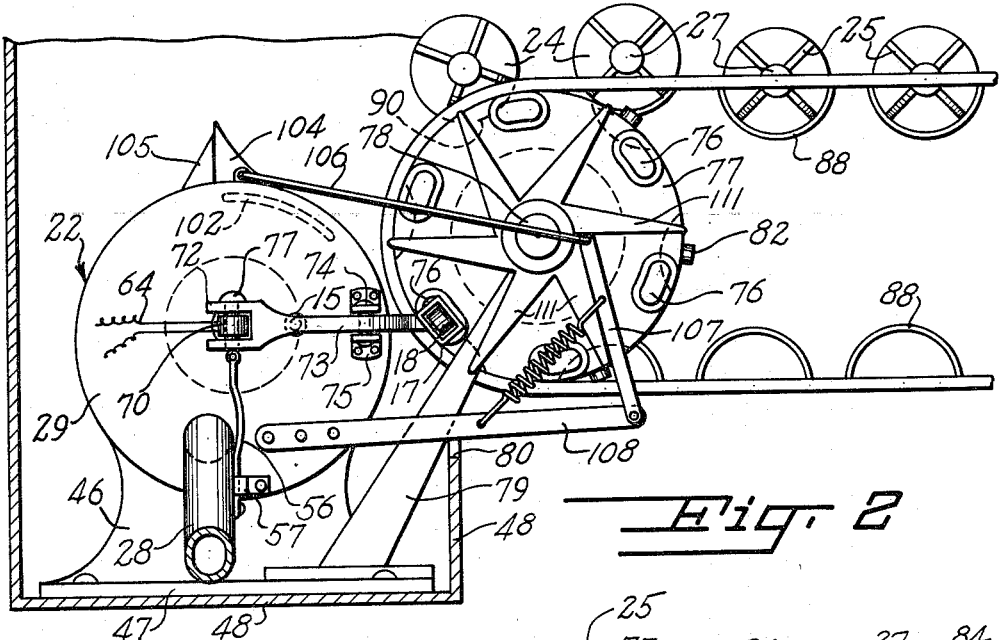
Figure 2 is a fragmentary rear elevational view of the aircraft rocket launcher.
Figure 3:
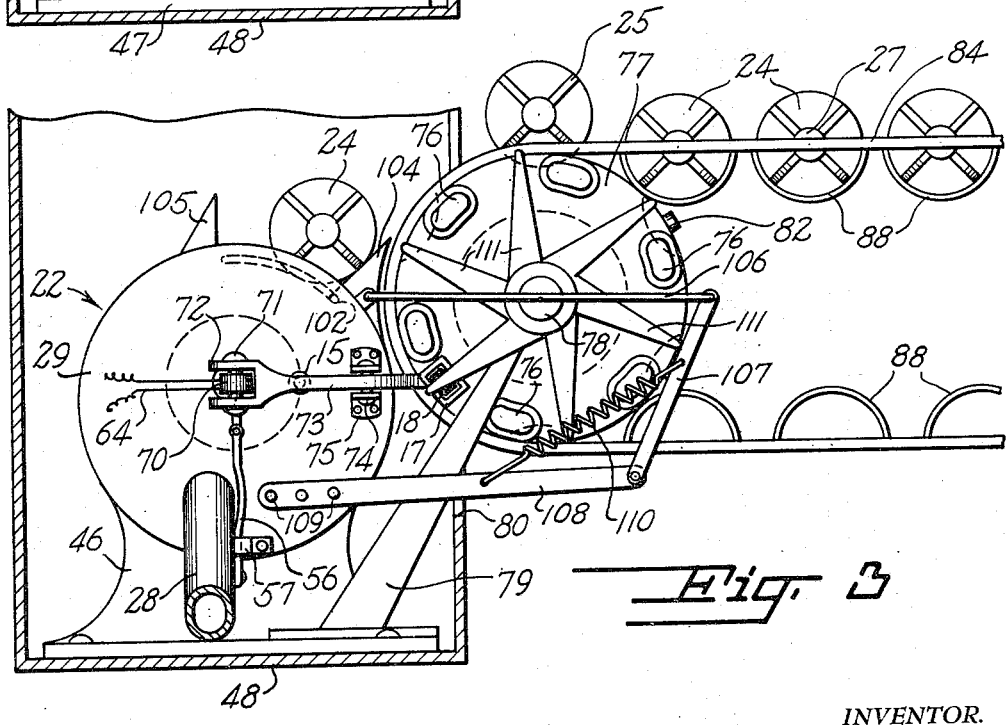
Figure 3 is a view similar to Figure 2, but showing the firing chamber door in open position.

The firing chamber 22 is provided with a sliding door 101 which is selectively opened, Figure 3, to permit a rocket 24 to be deposited in the firing chamber and the door is then closed, Figure 2, while the rocket is fired. A sliding door 101 carries a pair of pins 102 which move in recesses in the wall of the firing chamber, and there is also a cut-away portion 103, Figure 5, in the exterior of the firing chamber wall for permitting sliding movement as when the door is opened.

For opening and closing the door 101, a flange 104 is secured to the door. A stop member 105 projects from the exterior of the firing chamber 22 for abutting the flange 104 to limit closing movement of the door. A rod 106 has one end connected to the flange 104 and its other end pivotally connected to one end of a lever 107. The other end of the lever 107 is pivotally connected to a bar 108 which is secured to the back wall 29 by rivets 109. A spring 110 connects the lever 107 to the bar 108 for normally causing the lever to be pivoted in a counter-clockwise direction to thereby normally urge the door 22 to its closed position, Figure 2. Mounted on the shaft 78 adjacent the end thereof is a plurality of radially-disposed cam members 111 which engage the lever 107 to pivotally move it in a clockwise direction to thereby cause the rod 106 to open the door 103 to permit a rocket 24 to be positioned in the firing chamber. Upon continued rotation of the shaft 78, the tips of the cam members 111 slide past the lever 107 and the spring 110 biases the lever 107 in a counter-clockwise direction to close the door.

The operation of the mechanism is as follows: The rocket-launching devices are positioned in spaced relation in the aircraft, as shown in Figure 14, so that the barrels 23 project forwardly. Then, the belts 84 are loaded with the rockets 24, the rockets being supported on the straps 88, and upon actuation of the motor 100, the shaft 78 carrying roller 77 will rotate in a counterclockwise direction to feed the rockets one at a time to the firing chamber 22. Just as each rocket 24 is to be fed into the firing chamber 22, the sliding door 101 is opened and after each rocket enters the firing chamber, the sliding door is closed. After the rocket 24 is arranged in the firing chamber, the support member 62 carrying the hot plate 67 is moved forwardly so that the face of the hot plate 67 moves into engagement with the fuse 27 of the rocket 24. The weight of the rocket 24 on the yoke 40 moves the ring 60 downwardly to establish electrical contact with the hot plate 67 igniting the fuse 27 to thereby fire the rocket and the exhaust fumes pass out through conduit 28. Immediately after the rocket is fired, the roller 18 will be out of contact with the cam surfaces 76, so that the support member carrying hot plate 67 will be moved safely backwardly in the firing chamber. This cycle is repeated, whereby a great number of the rockets are fired in rapid succession.

I claim:

1. In a rocket-launching device for an aircraft, a firing chamber, a sliding door operatively connected to said chamber for permitting rockets to be deposited in the latter, a barrel projecting from the forward end of said firing chamber a rotatable roller positioned adjacent said firing chamber, a shaft extending longitudinally through said roller and adapted to be rotated by a source of power, a second shaft positioned in spaced, parallel relation with respect to said roller, a belt trained over said roller and said second shaft for conveying rockets to said firing chamber, a means operatively connecting said roller to said door for opening and closing the latter, means in said chamber for firing said rockets through said barrel, and a plurality of spaced clips connected along the side edges of said belt for reinforcing the latter.

2. In a rocket-launching device for an aircraft, a firing chamber, a sliding door operatively connected to said chamber for permitting rockets to be deposited in the latter, a barrel projecting from the forward end of said firing chamber a rotatable roller positioned adjacent said firing chamber, a shaft extending longitudinally through said roller and adapted to be rotated by a source of power, a second shaft positioned in spaced, parallel relation with respect to said roller, a belt trained over said roller and said second shaft for conveying rockets to said firing chamber, a means operatively connecting said roller to said door for opening and closing the latter, means in said chamber for firing said rockets through said barrel, a plurality of spaced clips connected along the side edges of said belt for reinforcing the latter, and resilient means mounted in said firing chamber for maintaining said rockets centered therein.

3. In a rocket-launching device for an aircraft, a firing chamber, a sliding door operatively connected to said chamber for permitting rockets to be deposited in the latter, a barrel projecting from the forward end of said firing chamber a rotatable roller positioned adjacent said firing chamber, a shaft extending longitudinally through said roller and adapted to be rotated by a source of power, a second shaft positioned in spaced, parallel relation with respect to said roller, a belt trained over said roller and said second shaft for conveying rockets to said firing chamber, a means operatively connecting said roller to said door for opening and closing the latter, means in said chamber for firing said rockets through said barrel, a plurality of spaced clips connected along the side edges of said belt for reinforcing the latter, resilient means mounted in said firing chamber for maintaining said rockets centered therein, and a housing spaced about said firing chamber for protecting said aircraft.

4. In a rocket-launching device for an aircraft, a firing chamber, a door operatively connected to said chamber for permitting rockets to be deposited in the latter, a barrel projecting from the forward end of said firing chamber, a rotatable roller positioned adjacent said firing chamber, a shaft extending through said roller and adapted to be rotated by a source of power, a second shaft positioned in spaced relation with respect to said roller, a belt trained over said roller and said second shaft for conveying rockets to said firing chamber, a means operatively connecting said roller to said door for opening and closing the latter, means in said chamber for firing said rockets through said barrel, and spaced clips connected along the side edges of said belt for reinforcing the latter.

ERNEST HOLLOWAY.

REFERENCES CITED

The following references are of record in the file of this patent:

UNITED STATES PATENTS

| Number | Name | Date |
|---|---|---|
| 1,849,205 | Rypinski | Mar. 15, 1932 |
| 2,088,503 | Broussard | July 27, 1938 |
| 2,440,723 | Macdonald | May 4, 1948 |
| 2,450,929 | Ashworth et al. | Oct. 12, 1948 |
| 2,451,522 | Uhl et al. | Oct. 19, 1948 |
| 2,451,745 | Jolly | Oct. 19, 1948 |
| 2,458,476 | Lauritsen et al. | Jan. 4, 1949 |
| 2,464,920 | Carter | Mar. 22, 1949 |